(12) United States Patent
Bentley et al.

(10) Patent No.: US 10,331,752 B2
(45) Date of Patent: Jun. 25, 2019

(54) METHODS AND SYSTEMS FOR DETERMINING QUERY DATE RANGES

(71) Applicant: Oath Inc., New York, NY (US)

(72) Inventors: Frank Richard Bentley, San Francisco, CA (US); Joseph Nathaniel Kaye, Mountain View, CA (US); David Ayman Shamma, San Francisco, CA (US); John Alexis Guerra Gomez, San Francisco, CA (US)

(73) Assignee: Oath Inc., New York, NY (US)

( * ) Notice: Subject to any disclaimer, the term of this patent is extended or adjusted under 35 U.S.C. 154(b) by 359 days.

(21) Appl. No.: 14/804,835

(22) Filed: Jul. 21, 2015

(65) Prior Publication Data

US 2017/0024388 A1 Jan. 26, 2017

(51) Int. Cl.
*G06F 16/9537* (2019.01)

(52) U.S. Cl.
CPC ............... *G06F 16/9537* (2019.01)

(58) Field of Classification Search
CPC . G06F 7/00; G06F 17/30; G06F 15/16; G06F 17/30867; G06F 17/30864; G06F 17/3053; G06F 17/3087; G06F 17/30241; G06F 17/30613; G06F 17/30398; G06F 17/30905; G06F 17/30861; G06F 16/9537; G06F 16/953; G06F 16/95; G06F 16/9536; G06Q 30/02; G06Q 30/0256
USPC ...................... 707/725, 727, 722, 5, E17.14
See application file for complete search history.

(56) References Cited

U.S. PATENT DOCUMENTS

| | | | | |
|---|---|---|---|---|
| 7,966,311 B2* | 6/2011 | Haase | ............... | G06F 17/30448 707/713 |
| 8,380,705 B2* | 2/2013 | Tong | ................. | G06F 17/30864 707/721 |
| 8,626,768 B2* | 1/2014 | Bailey | ............... | G06F 17/30864 707/738 |
| 9,105,028 B2* | 8/2015 | Richard | ................. | G06Q 30/00 |
| 9,582,543 B2* | 2/2017 | Brew | ................. | G06F 17/30528 |
| 2002/0107842 A1* | 8/2002 | Biebesheimer | ... | G06F 17/30864 |
| 2006/0004713 A1* | 1/2006 | Korte | ................. | G06F 17/30867 |
| 2006/0248063 A1* | 11/2006 | Gordon | ............. | G06F 17/30011 |
| 2007/0067304 A1* | 3/2007 | Ives | ................... | G06F 17/30864 |
| 2008/0082578 A1* | 4/2008 | Hogue | .............. | G06F 17/30864 |
| 2008/0097972 A1* | 4/2008 | Gordon | ............. | G06F 17/30011 |

(Continued)

*Primary Examiner* — Jay A Morrison
*Assistant Examiner* — Antonio J Caiado
(74) *Attorney, Agent, or Firm* — Cooper Legal Group, LLC

(57) ABSTRACT

One or more systems and/or methods for determining a query date range and/or searching a content corpus are provided. A set of content items (e.g., digital images, videos, etc.), associated with an event, may be identified from a content corpus. The set of content items may be evaluated to identify temporal features (e.g., digital time stamps) for the set of content items. A query date range for the event may be determined based upon the temporal features (e.g., users may capture photos that are related to Christmas from December $4^{th}$ to December $27^{th}$). In an example, responsive to receiving a search query, associated with the event, the search query may be adjusted based upon the query date range to create an adjusted search query. The content corpus may be searched using the adjusted search query to create search query results for the search query.

20 Claims, 8 Drawing Sheets

(56) References Cited

U.S. PATENT DOCUMENTS

| | | | |
|---|---|---|---|
| 2009/0006324 A1* | 1/2009 | Morris | G06F 17/30864 |
| 2009/0019013 A1* | 1/2009 | Tareen | G06F 17/30722 |
| 2009/0055392 A1* | 2/2009 | Gupta | G06F 17/30867 |
| 2009/0287691 A1* | 11/2009 | Sundaresan | G06F 17/30864 |
| 2010/0268597 A1* | 10/2010 | Bookstaff | G06F 17/30864 |
| | | | 705/14.49 |
| 2010/0306249 A1* | 12/2010 | Hill | G06F 17/30867 |
| | | | 707/769 |
| 2011/0225137 A1* | 9/2011 | Patel | G06F 17/30867 |
| | | | 707/706 |
| 2012/0084282 A1* | 4/2012 | Chiang | G06F 17/30864 |
| | | | 707/725 |
| 2012/0124052 A1* | 5/2012 | Furey | G06Q 10/00 |
| | | | 707/740 |
| 2013/0297581 A1* | 11/2013 | Ghosh | G06F 17/30864 |
| | | | 707/706 |
| 2014/0114940 A1* | 4/2014 | Prahlad | G06F 17/30442 |
| | | | 707/696 |
| 2014/0214888 A1* | 7/2014 | Marquardt | G06F 17/30477 |
| | | | 707/769 |
| 2015/0154508 A1* | 6/2015 | Chen | G06F 17/3053 |
| | | | 706/12 |
| 2015/0234862 A1* | 8/2015 | Patil | G06F 17/30259 |
| | | | 707/706 |
| 2015/0254307 A1* | 9/2015 | Johnson | G06F 17/30469 |
| | | | 707/763 |
| 2017/0017636 A1* | 1/2017 | Hasan | G06F 17/273 |

* cited by examiner

US 10,331,752 B2

METHODS AND SYSTEMS FOR DETERMINING QUERY DATE RANGES

BACKGROUND

Many search users may search a content corpus (e.g., social media networks, digital image sharing websites, public wide area networks, etc.) to locate relevant content items (e.g., digital images, videos, audio recordings, etc.) on a regular basis. Unfortunately, search results for certain types of content items may have limited accuracy. In an example, a search user may submit a search query through a search engine to locate digital images associated with an event, such as Halloween. The search engine may utilize the search query to generate search results for content items within the content corpus that correspond to the search query (e.g., images explicitly tagged as Halloween and/or photos captured on October $31^{st}$). However, search users often over specify search queries, such as in regards to date ranges and/or date-based terms (e.g., a search user may personally associate Halloween with a broader date range, such as 2 weeks leading up to Halloween, than how a search query of "Halloween" is interpreted such as corresponding to merely October $31^{st}$). Thus, a search engine may omit relevant content items from search results (e.g., a digital image created on October $16^{th}$ may be interesting to the search user, but the digital image may be omitted from search results because the search query of "Halloween" may be limited to October $31^{st}$). Unfortunately, many computing devices and/or search engines may lack technology that can accurately identify relevant content items because such content items may not correspond to exact search query dates. Because relevant content items may end up being omitted from search results, search users may need to submit multiple search queries to locate desired content items.

SUMMARY

In accordance with the present disclosure, one or more systems and/or methods for determining a query date range for an event and/or adjusting a search query based upon the query date range are provided. A set of content items, (e.g., digital images, videos, etc.) within a content corpus (e.g., an online digital image sharing social network, a database of home movies, etc.), may be identified as being associated with an event (e.g., Independence Day, a decade such as the 80's, etc.). In an example, a content item within the content corpus may be evaluated to identify a tag (e.g., metadata tag) of the content item. Responsive to the tag corresponding to the event, the content item may be included in the set of content items because a date of the content item may be indicative of a date range for the event (e.g., the content item may correspond to a photo of an air show that routinely occurs one week before Independence Day). The set of content items may be evaluated to identify temporal features (e.g., digital time stamps, such as for when a digital image was created and/or uploaded, etc.) for the set of content items. A query date range for the event may be determined based upon the temporal features. The query date range may comprise one or more dates or date ranges within one or more time periods (e.g., different date ranges may be specified for Easter for different periods/years because Easter may fall on different dates on different years; a weekend may be extended to include additional days beyond Saturday and Sunday due to holidays, such as a 3 day $4^{th}$ of July weekend). In an example, the query date range may comprise a strict date range (e.g., the strict date range for Independence Day would be July $4^{th}$) and a periphery date range (e.g., community driven consensus of when an event occurs, such as July $1^{st}$ to July $10^{th}$ for Independence Day) determined based upon the temporal features. In an example, the periphery date range for the event may be determined based upon densities for dates within a distribution of dates (e.g., a probability distribution of dates) corresponding to the temporal features of the set of content items. The dates within the distribution of dates may be evaluated to determine confidence scores for the dates therein. The confidence scores may be determined based upon at least one of the density for the densities for the dates within the distribution of dates (e.g., a higher confidence may be assigned to December $15^{th}$ because a relatively higher density of Christmas content may have been captured on December $15^{th}$, whereas December $19^{th}$ may be assigned a lower confidence because a relatively lower density of Christmas content may have been captured on December $19^{th}$) or a distance in time between the strict date range and dates within the distribution of dates. Responsive to the confidence score for a date within the distribution of dates exceeding a confidence score threshold, the date may be included in the periphery date range.

In an example, responsive to receiving a search query, associated with the event, from a search user, the search query may be adjusted based upon the query date range to create an adjusted search query (e.g., a search query date of July $4^{th}$ may be expanded to July $1^{st}$ through July $10^{th}$). In an example, responsive to receiving the search query, a characteristic of the search user may be determined (e.g., a college attended by the search user, a holiday event planner society, an interest of the user specified through a social network profile, a message topic or social network post topic associated with the user, a geographic location of the user, an associated with a community of users, user demographic information such as age, etc.). A first query date range, but not a second query date range, may be utilized based upon the characteristic (e.g., the user may attend a college that has a different spring break than another college). The content corpus may be searched using the adjusted search query to create search query results for the search query. The search query results may be ranked to generate ranked search query results. In an example, the search query results may be ranked, based upon a confidence score for a date associated with a search query result, wherein the confidence score corresponds to a density for the date and/or a confidence level for a tag corresponding to the event, to generate ranked search query results.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware, or any combination thereof.

1. Computing Scenario

The following provides a discussion of some types of computing scenarios in which the disclosed subject matter may be utilized and/or implemented.

1.1. Networking

Figure 1:
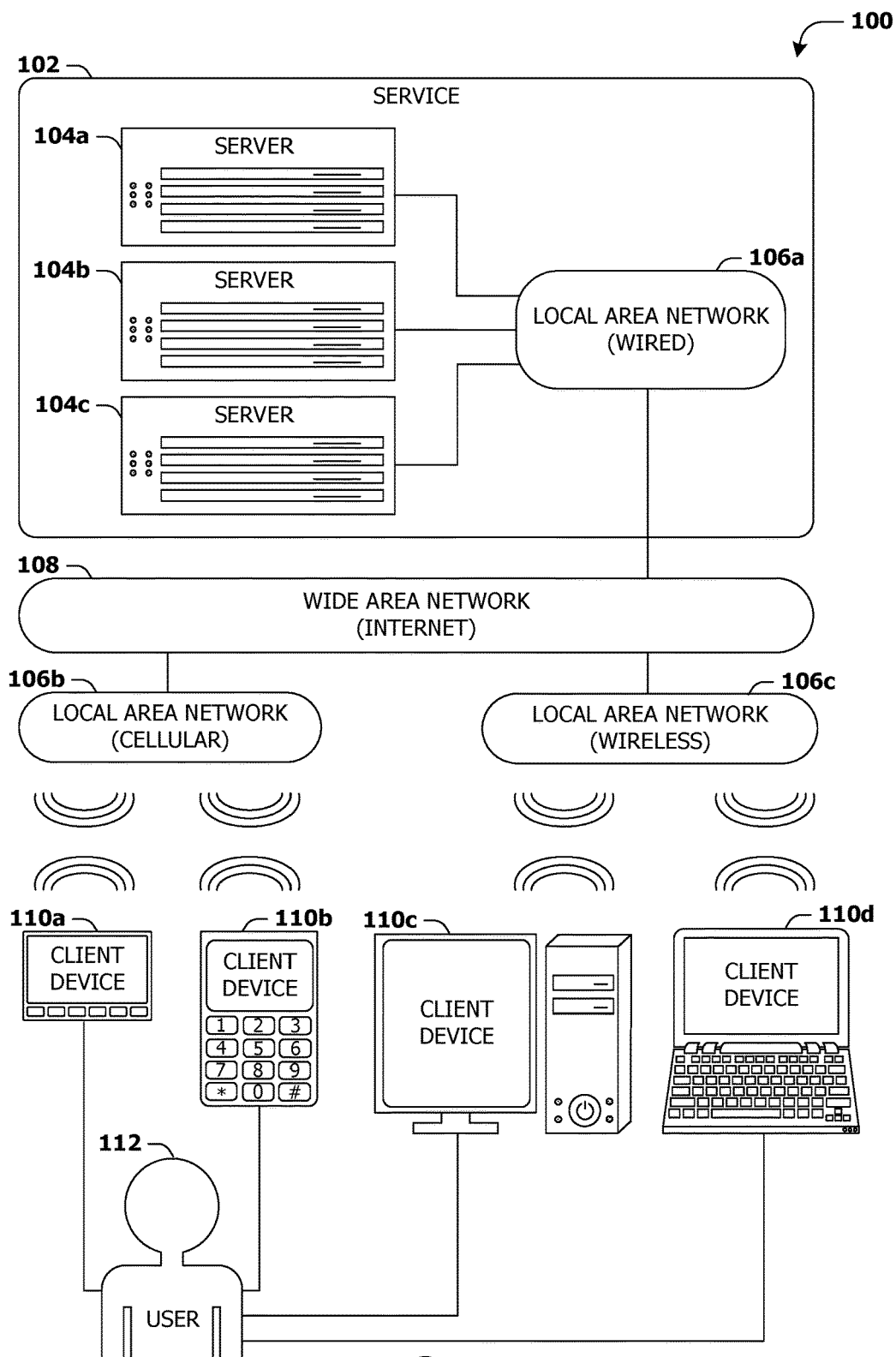
FIG. 1 is an illustration of a scenario involving various examples of networks that may connect servers and clients.

FIG. 1 is an interaction diagram of a scenario 100 illustrating a service 102 provided by a set of servers 104a, 104b, 104c to a set of client devices 110a, 110b, 110c 110d via various types of networks. The servers 104a, 104b, 104c and/or client devices 110a, 110b, 110c, 110d may be capable of transmitting, receiving, processing, and/or storing many types of signals, such as in memory as physical memory states.

The servers 104a, 104b, 104c of the service 102 may be internally connected via a local area network 106a (LAN), such as a wired network where network adapters on the respective servers 104a, 104b, 104c are interconnected via cables (e.g., coaxial and/or fiber optic cabling), and may be connected in various topologies (e.g., buses, token rings, meshes, and/or trees). The servers 104a, 104b, 104c may be interconnected directly, or through one or more other networking devices, such as routers, switches, and/or repeaters. The servers 104a, 104b, 104c may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106a may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106a may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106a may comprise one or more sub-networks, such as may employ differing architectures, may be compliant or compatible with differing protocols, and/or may interoperate within the local area network 106a. Additionally, a variety of local area networks 106a may be interconnected; e.g., a router may provide a link between otherwise separate and independent local area networks 106a.

In the scenario 100 of FIG. 1, the local area network 106a of the service 102 is connected to a wide area network 108 (WAN) that allows the service 102 to exchange data with other services 102 and/or client devices 110a, 110b, 110c, 110d. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110a, 110b, 110c, 110d, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110a, 110b, 110c, 110d may communicate with the service 102 via various connections to the wide area network 108. As a first such example, one or more client devices 110a, 110b, 110c, 110d may comprise a cellular communicator and may communicate with the service 102 by connecting to the wide area network 108 via a wireless local area network 106b provided by a cellular provider. As a second such example, one or more client devices 110a, 110b, 110c, 110d may communicate with the service 102 by connecting to the wide area network 108 via a wireless local area network 106c provided by a location such as the user's home or workplace (e.g., a WiFi network or a Bluetooth personal area network). In this manner, the servers 104a, 104b, 104c and the client devices 110a, 110b, 110c, 110d may communicate over various types of networks. Other types of networks that may be accessed by the servers 104a, 104b, 104c and/or client devices 110a, 110b, 110c, 110d include mass storage, such as network attached storage (NAS), a storage area network (SAN), or other forms of computer or machine readable media.

1.2. Server Configuration

Figure 2:
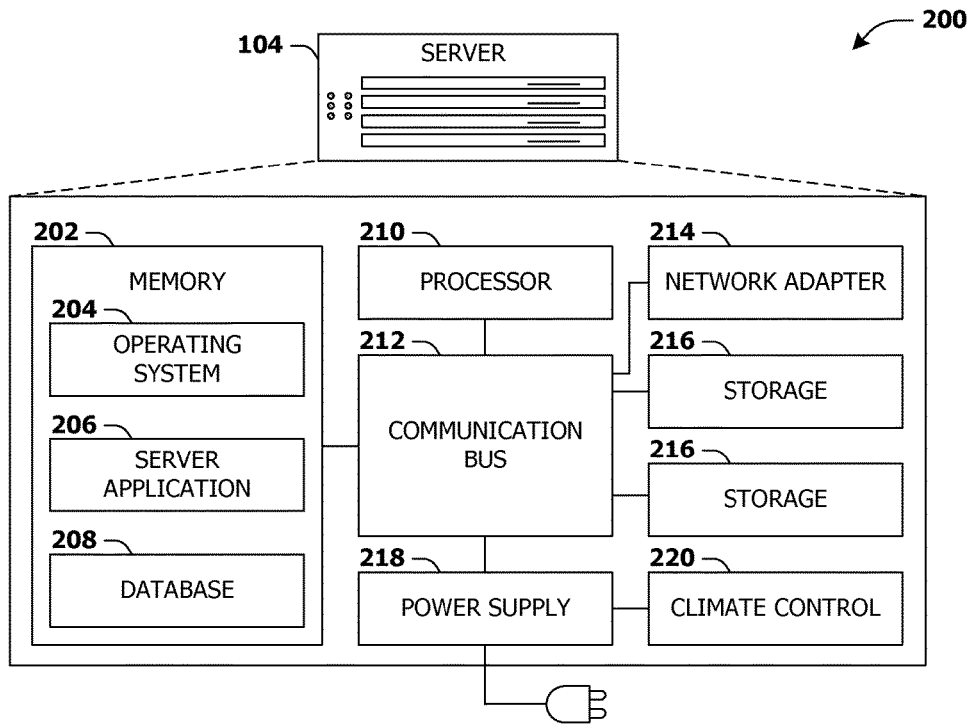
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectable to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
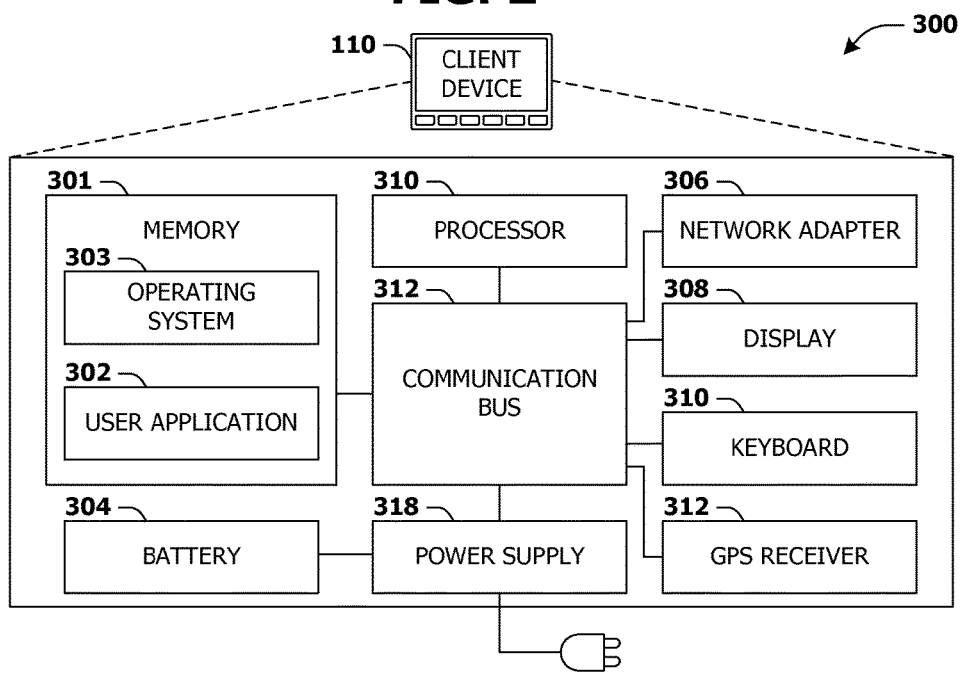
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectable to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more systems and/or techniques for determining a query date range and/or performing a search utilizing the query date range are provided. Many search engines and/or search techniques may lack an ability to provide accurate search results for search queries associated with events (e.g., Christmas, autumn, Memorial Day, National Donut Day, etc.). As provided herein, a set of content items, (e.g., digital images, videos, etc.) from a content corpus (e.g., an online digital image sharing social network, a database of home movies, etc.), may be identified as being associated with an event. In an example, a content item within the content corpus may be evaluated to identify a tag of the content item. Responsive to the tag corresponding to the event, the content item may be included in the set of content items. The set of content items may be evaluated to identify temporal features (e.g., digital time stamps) for the set of content items. A query date range for the event may be determined based upon the temporal features (e.g., photos, identified as being associated with Christmas, may span a range of December $10^{th}$ through December $26^{th}$). In an example, responsive to receiving a search query, associated with the event, from a search user, the search query may be adjusted based upon the query date range to create an adjusted search query. The content corpus may be searched using the adjusted search query to create search query results for the search query.

By determining a query date range for an event and utilizing the query date range to adjust a search query, a search user's experience may be improved because relevant content, which may otherwise not be included as search results because such content may correspond to a date that is not an exact match to a date of the search query, may be provided as search results (e.g., a Christmas photo captured on December $12^{th}$ may be identified as a search result for a Christmas search query that would otherwise have been limited to December $25^{th}$). Thus, the search user may more efficiently identify search results that may otherwise have been undiscovered by the search user. In an example, an operating efficiency of the search user and/or a search engine may be improved by determining and/or utilizing the query date range. For example, the search user may be more efficiently locate relevant search results by utilizing the query date range, which may mitigate wasted computing resources and time otherwise spent attempting to locate relevant content.

Figure 4:
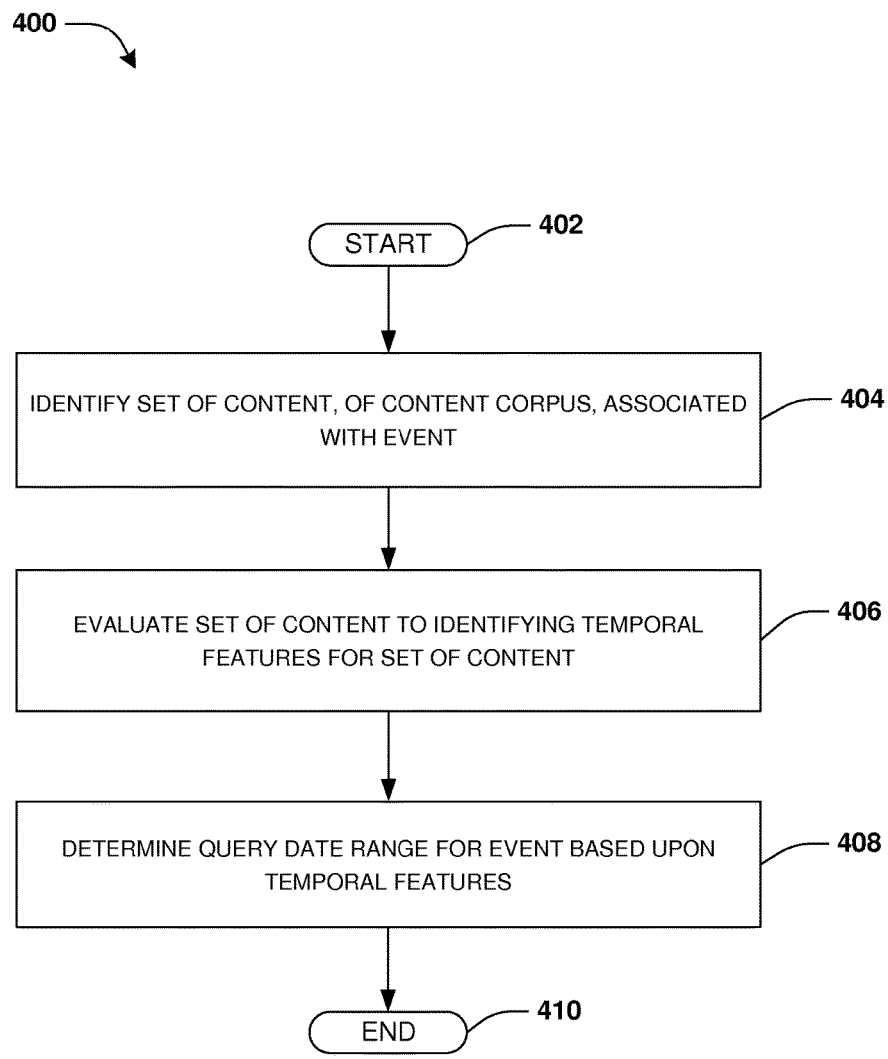
FIG. 4 is a flow chart illustrating an example method determining a query date range for an event.

An embodiment of defining a query date range for an event is illustrated by an example method 400 of FIG. 4. At 402, the method 400 starts. At 404, a set of content items associated with an event may be identified. The set of content items may be identified from a content corpus. The content corpus may comprise a database (e.g., a private photo library database of a user, an email database, a medical record database, etc.), a web object (e.g., a server based web application), a web page (e.g., a web document, such as one written in HTML, viewable through a web browser), a website or web service (e.g., a collection of web pages, such as a social networking website, a photo sharing website, a microblogging website, a community message board website, etc.), an electronic document (e.g., a PDF), a private wide area network (e.g., a virtual private network for an organization), and/or a public wide area network (e.g., the internet). In an example, a content item within the set of content items may comprise an image content item, a video content item, a text content item (e.g., a text message, a news article, a social media post, a comment associated with an image, a calendar entry, etc.), an audio content item, or the like.

In an example, the event may comprise a holiday (e.g., a religious holiday, a national holiday, a cultural holiday, such as April Fool's Day, Groundhog Day, etc.), an anniversary (a wedding anniversary, a work anniversary, a historical event anniversary, a birthday, such as a friend's birthday, a public figure's birthday, etc.), a season (e.g., spring, winter, fall, summer, etc.), a community event (e.g., a festival, a sporting event, a political event, a social event for a group, etc.), an environmental event (e.g., a solstice, an equinox, an astrological event, etc.), a month, a reoccurring event (e.g., ides of march, a user created reoccurring calendar event, etc.), a decade (e.g., 1980's, 1990's, etc.), or the like.

In an example, the event may be associated with an event aspect, such as a set of keywords (e.g., "Happy Holidays"), known image features or objects (e.g., a snowman, an elf, etc.), an event location, and/or an event community of users (e.g., the event may be celebrated by a first community of social network users attending a particular college, but not a second community of social network users attending a different college). In an example, the event aspect may be utilized in the evaluation of content items within the content corpus to determine if the content items are associated with the event. For example, the content items may be evaluated to identify a geographical location (e.g., geographical location of a user associated with the content item, a geographical location of an object within the content item, a geographical location where the content item was created, etc.) and/or a community of users associated with the content item. Responsive to the geographical location or the community of users corresponding to the event location or the event community of users, the content item may be determined to be associated with the event and the content item may be included in the set of content items.

In another example, the content items within the content corpus may comprise one or more tags (e.g., annotations, labels, etc.). The tags may provide descriptive and/or contextual information regarding the content item associated therewith (e.g., a tag may include various fields of descriptive content, such as a rating of a particular content item, a list of keywords identifying an object and/or a feature within the content item, etc.) The tags may comprise metadata (e.g., geotags, hashtags, machine tags, knowledge tags, computer vision tags, etc.), markup language (e.g., extensible markup language (XML), hypertext markup language (HTML), etc.), elements (e.g., void elements, raw text elements, normal elements, other HTML elements, etc.), and/or the like. In an example, the tag of a particular content item may be evaluated to determine if the particular content item corresponds to the event. Responsive to the tag corresponding to the event, the particular content item may be included in the set of content items because a date of the content item may be indicative of the event (e.g., a Christmas photo captured on December $12^{th}$ may indicate that content items captured on December $12^{th}$ may be related to Christmas that may otherwise have been defined merely as December $25^{th}$).

In another example, one or more recognition analysis models may be utilized to identify the set of content items associated with the event from the content corpus. The recognition analysis model may comprise an image recognition analysis model (e.g., pattern recognition, sketch recognition, facial recognition, etc.), a video recognition analysis model (e.g., gate recognition, moving facial recognition from a live video stream), an audio recognition analysis model (e.g., processing audio of a content item to identify key words), a textual recognition analysis model (optical character recognition), or the like. The recognition analysis model may utilize machine-learning techniques (e.g., algorithms may be utilized to evaluate data, such as from content items and make predictions regarding the data, for training). In an example, the recognition analysis model may determine identities of objects (e.g., a person, a place, a thing, etc.) within content items. For example, an image recognition analysis model, such as one utilizing a deep convolutional neural net, may be utilized to evaluate a digital image content item to identify a feature of the digital image content item (e.g., curve, line, coloring, etc. associated with the digital image). The feature may be evaluated to determine the object, such as a dog, within the digital image content item. In an example, the digital image content item may be evaluated by matching the digital image content item to a plurality of layers and/or features for known digital images for the same and/or similar objects (e.g., a first layer may be configured to recognize basic image features, such as straight lines, corners, circular arcs, triangles, circles, etc., and a second layer may be configured to recognize complex shapes, such as eyes, mouths, noses, paws, logos, etc.).

In an example, a confidence level may be determined for the match between the digital image content item and the plurality of layers for the known digital images. Responsive to the confidence level exceeding a threshold amount, the digital image content item may be determined to contain the object. In an example, responsive to identifying the object within a digital image content item, the digital image content item may be tagged with a tag corresponding to the object, such as the dog. In this way, objects within content items without tags and/or with tags which lack sufficient information to determine the identity of the object may be identified.

At 406, the set of content items may be evaluated to identify temporal features for the content items within the set of content items. The temporal features may correspond to creation dates, upload dates, modification dates, user specified dates (e.g., the user may specify a date that a digital image was created by manually entering the creation date), dates associated with objects within the content item (e.g., image recognition analysis model may identify snow in a digital image and identify a winter season temporal feature, etc.), dates associated with user applied tags, etc. In an example, tags associated with the content item may be evaluated to determine a temporal feature for the content item. For example, a metadata tag (e.g., timestamp) may be evaluated to determine a date and/or a time the content item was created. In an example, a data file (e.g., a Java file, exchangeable image file format file, etc.) associated with the content item may be evaluated to identify the tag corresponding to the temporal feature for the content item. In yet another example, textual content associated with a user interaction (e.g., posting, sharing, editing, etc.) with the content item may be evaluated to identify the temporal feature for the content item. For example, a comment associated with the digital image content item shared on a photo-sharing website may be evaluated to identify the temporal feature for the content item (e.g., a comment published with the digital image on a blog stating, "This was the best Friday the $13^{th}$ ever").

At 408, a query date range for the event may be determined based upon the temporal features of the set of content items. The query date range may comprise one or more dates or date ranges for one or more time periods associated with the event (e.g., a three-day range, a two-week range, a one-month range, a 2-year range, a 5 day range for a first time period and a nine day range for a second time period, etc.). In an example, the query date range may comprise a relative date range (e.g., "the weekend before Christmas", "the Saturday nearest to Halloween", "the week after Easter", etc.). The query date range may comprise time periods associated with the event extending backwards in time to the start of the collection. The query date range may comprise a first date range for a first period and a second date range for a second period, wherein the first date range includes at least some different dates than the second date range (e.g., a first date range for Christmas in 2012 may include December $5^{th}$, December $19^{th}$, December $25^{th}$, and December $27^{th}$ and a second date range for Christmas in 2013 may include December $9^{th}$, December $17^{th}$, December $25^{th}$, and December $26^{th}$). In an example, the query date range may comprise a strict date range for the event and periphery date ranges for each of the one or more time periods associated with the event. The strict date range may be determined based upon a canonical representation of the date and/or dates of the event for a particular time period (e.g., an official date range for an event, such as December $25^{th}$ for Christmas or November $27^{th}$ for Thanksgiving 2014 in the U.S. and November $28^{th}$ for Thanksgiving 2013 in the U.S., etc.). The periphery date ranges may be determined by generating a distribution of dates from the temporal features to identify densities for the dates within the distribution of dates (e.g., a probabilistic distribution of dates around the strict date range accepted by users in a community as corresponding to the event, which may be identified based upon dates specified by temporal features of content items within the set of content items). The densities for the dates within the distribution of dates may be determined based upon a number of content items within the set of content items associated with the dates (e.g., a first date having 10 content items associated therewith may have a greater density than a second date having 4 content items associated therewith). The distribution of dates may be evaluated to determine a confidence score for each date within the distribution of dates (e.g., the query date range for Christmas may be determined based upon the strict date range of December $25^{th}$ for Christmas and the periphery date range of December $3^{rd}$ to December $30^{th}$ based upon a Christmas video having a timestamp of December $3^{rd}$ and Christmas image having an upload date of December $30^{th}$).

In an example, the confidence score may be determined based upon a distance-in-time between the strict date range and each date within the distribution of dates and/or the density of each date within the distribution of dates (e.g., responsive to identifying 30 digital images tagged "Christmas" on December $15^{th}$ and 8 digital images tagged "Christmas" on December $22^{nd}$, December $15^{th}$ may be determined to have a higher confidence score than December $22^{nd}$ due to a relatively larger digital image density for December $15^{th}$). Responsive to the confidence score for a date exceeding a confidence score threshold, the date may be included in the periphery date range for the event. In another example, responsive to the confidence score for the date not exceeding the confidence score threshold, the date may not be included in the periphery date range for the event (e.g., a photo of a Christmas Ale beer may have been posted by a user on July $20^{th}$, which may have a low confidence score due to a relatively low density of content items associated with July $20^{th}$ and/or a relatively large distance-in-time between Summer and December $25^{th}$). In an example, the confidence score for the date may correspond to a number of content items within the set of content items that are associated with the date (e.g., the greater the number of content items that are associated with a date, the greater the confidence score). In another example, the confidence score for the date associated with the content item may be positively and/or negatively impacted by a confidence level associated with the tag utilized to determine the content item's association with the event.

In an example, the set of content items may be tagged with the query date range and/or the event. In an example, a metatag, comprising the dates for the query date range, may be attached to the content items within the set of content items. In this way, the tag corresponding to the query date range and/or the event may be utilized to facilitate subsequent search querying.

In an example, a search query may be received from a search user. For example, the search user may submit the search query (e.g., "winter in Chicago") through a search tool, such as a web-based search engine, an operating system search tool, or the like. The search query may be evaluated to determine that the search query is associated with the event. Responsive to the search query being associated with the event corresponding to the query date range, the search query may be adjusted based upon the query date range to create an adjusted search query. In an example, the search query may be adjusted by expanding a user specified temporal term with the query date range (e.g., the date range for the user entered temporal term "winter" may be expanded to include a portion of fall and/or spring in response to home other community members interpret/view/perceive the term "winter").

In an example, the content corpus may be searched utilizing the adjusted search query to generate search query results from content items therein. In another example, a different content corpus may be search utilizing the adjusted search query (e.g., the search query date range may be determined based upon content items from a first content corpus, such as an social photo sharing network, and subsequently utilized to perform a search for content items within a second content corpus, such as personal photo database on a private home network). In an example, the search query results may be identified based upon a confidence level for a tag of a content item (e.g., a computer vision tag, a metadata tag, etc.) and/or a confidence score for a temporal feature of the content item. In another example, content items, tagged with a tag specifying the query date range, may be identified as search query results. By adjusting the search query based upon the query date range, the overall user search experience may be improved because the search results may comprise relevant content items that otherwise may not have been identified.

In an example, the search query results may be ranked to generate ranked search query results. For example, a content item within the search query results may be assigned a weight (e.g., a value) based upon a confidence level for a tag of the content item and/or a confidence score for a date of the content item. The content items may be ranked based upon the weight assigned thereto. In some embodiments, machine-learned ranking (MLR) models may be utilized to rank search query results. In an example, the MLR models may comprise a supervised and/or a semi-supervised machine learning problems for automatically construct a ranking model from training data, such as the set of content items. In an example, the search query results may be ranked based upon the confidence score for a date within the query search range and/or a confidence level for a tag. At 410, the method 400 ends.

Figure 5A:
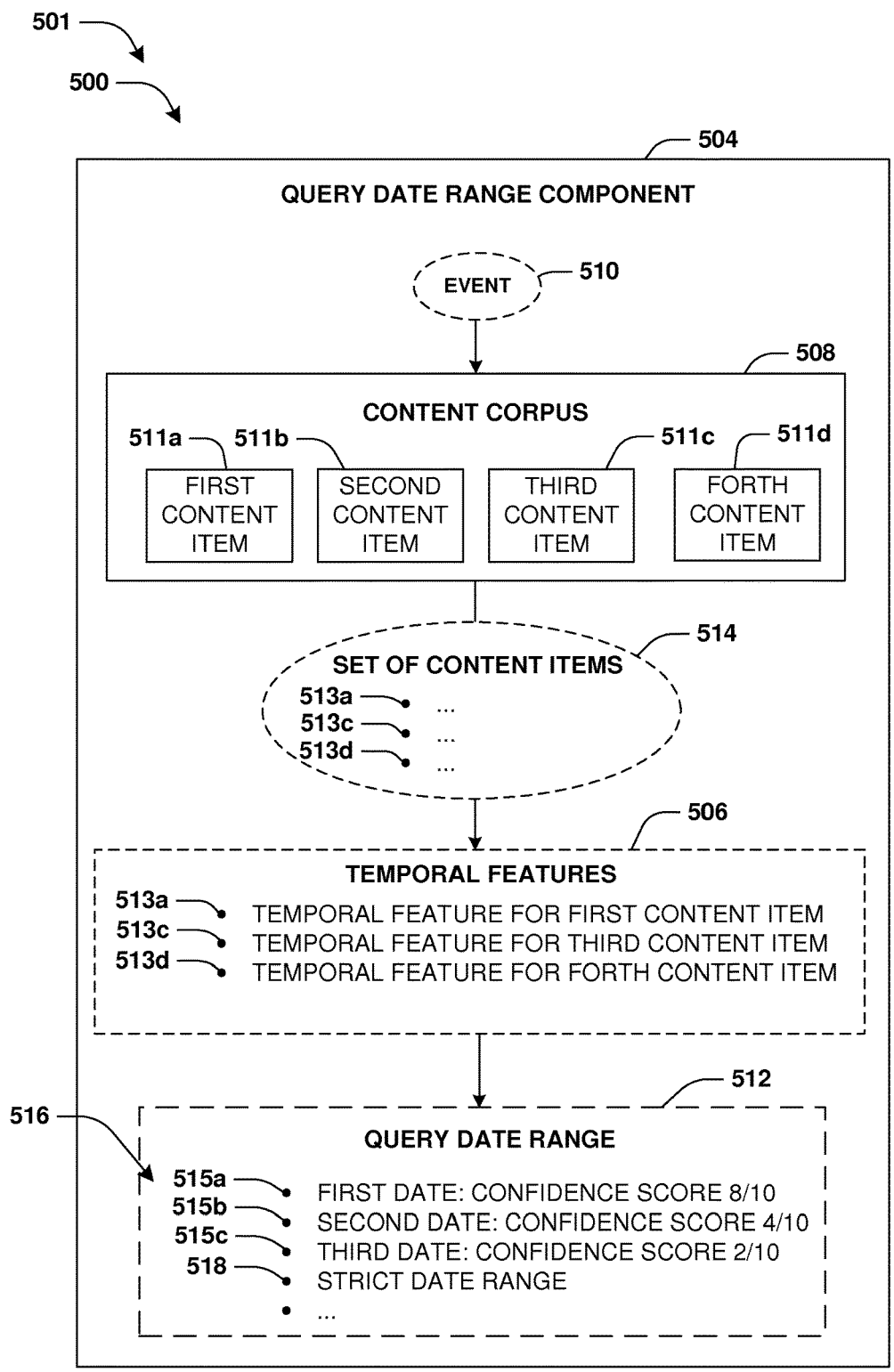
FIG. 5A is a component block diagram illustrating an example system for determining a query date range for an event.
Figure 5B:
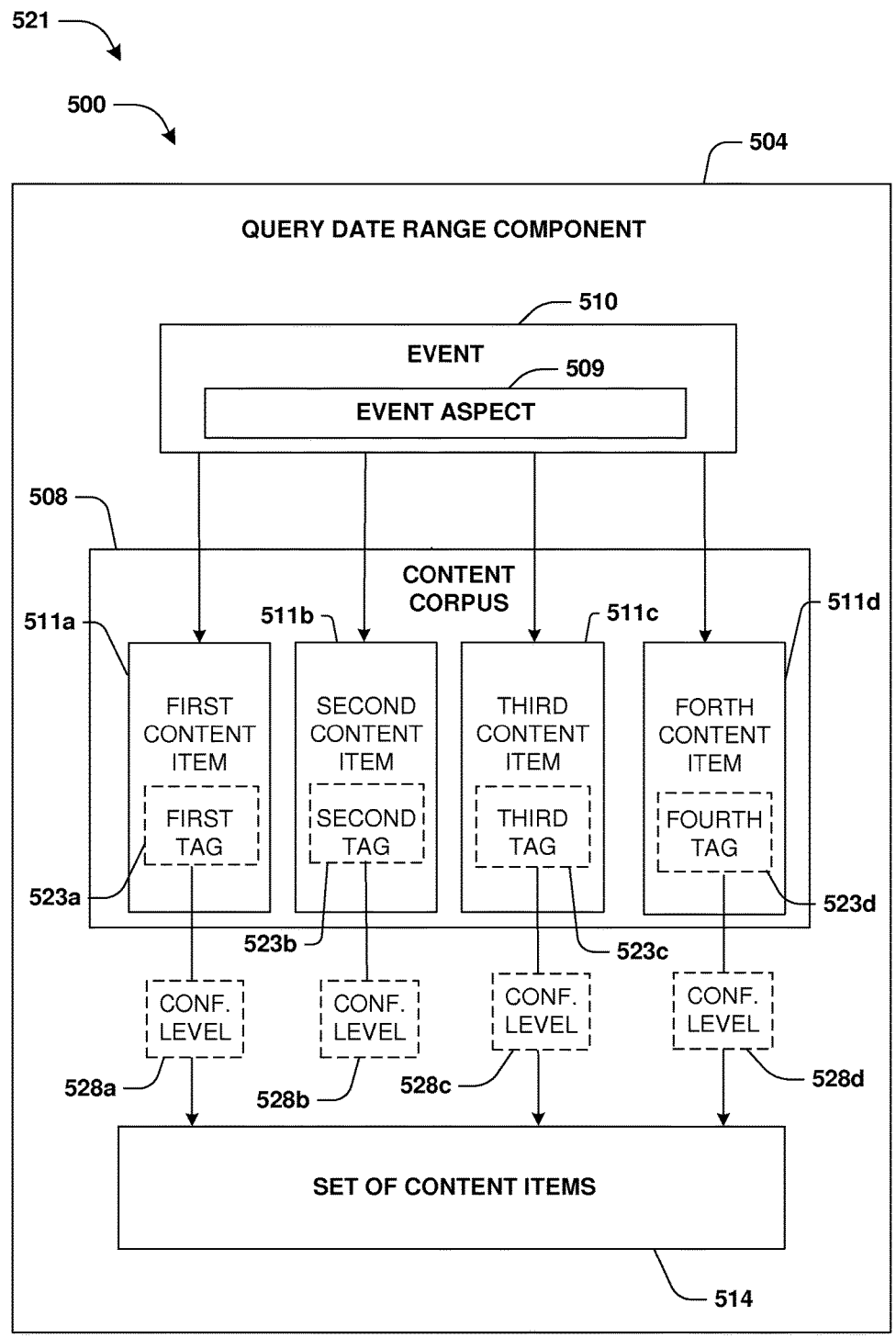
FIG. 5B is a component block diagram illustrating an example system for determining a query date range for an event, wherein content items corresponding to the event are identified.
Figure 5C:
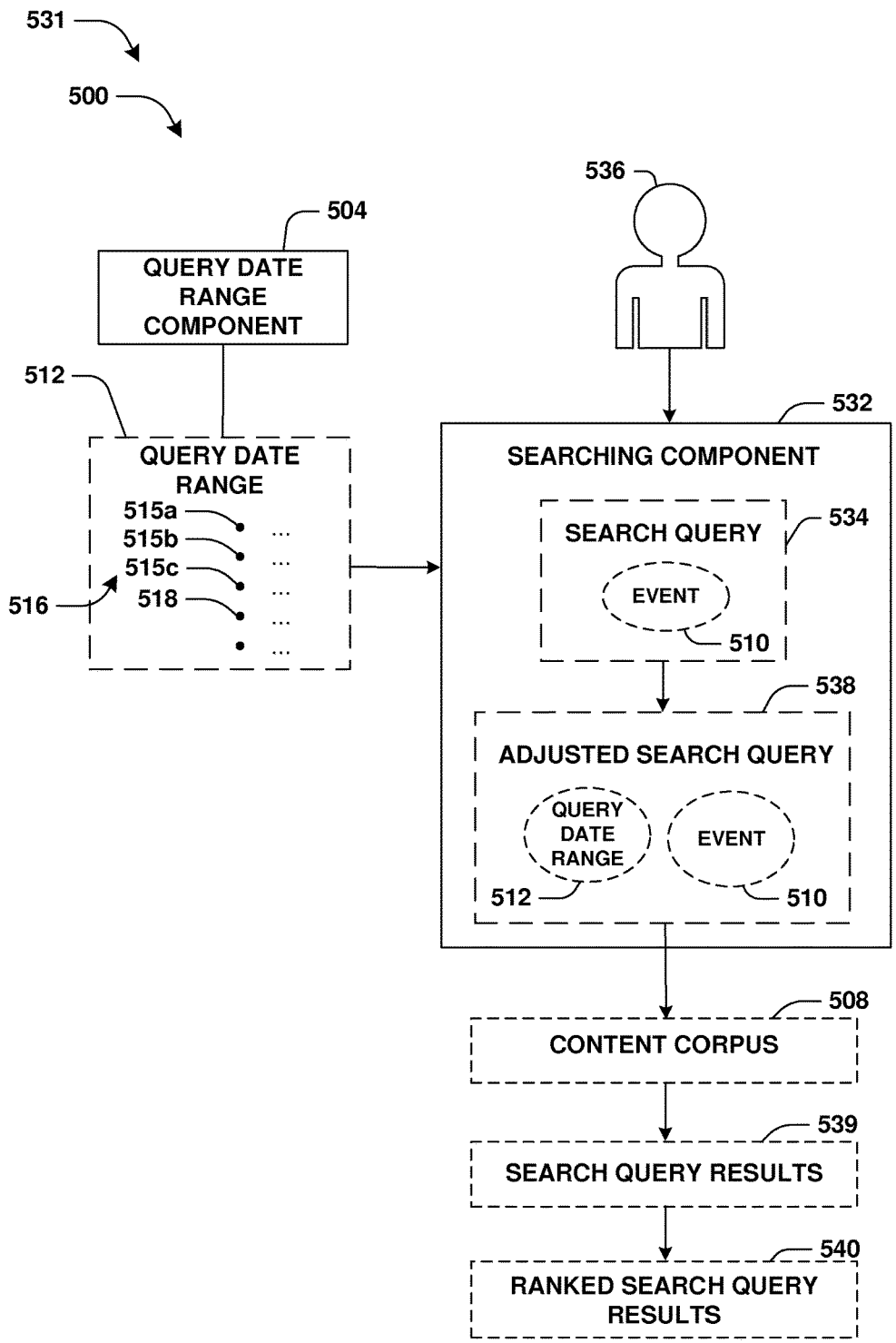
FIG. 5C is a component block diagram illustrating an example system for determining a query date range for an event, wherein a search is performed utilizing the query date range.

FIGS. 5A-5C illustrate examples of a system 500 where a query date range 512, associated with an event 510, is determined. In an example, the system 500 may comprise a query date range component 504 and/or a searching component 532. FIG. 5A illustrates an example 501 where the query date range component 504 may be configured to identify a set of content items 514, from a content corpus 508, associated with the event 510 (e.g., Halloween videos). The query date range component 504 may be configured to evaluate tags 523a-523d of content items 511a-511d within the content corpus 508 to determine if content items 511a-511d are associated with the event 510 (e.g., date tags, descriptive textual tags, etc.), as illustrated in FIG. 5B. In an example, the query date range component 504 may compare the tags 523a-523d to an event aspect 509 for the event 510 (e.g., a date of Halloween, objects depicted in Halloween videos, and/or other features and objects associated with Halloween). For example, the query date range component 504 may determine that tag 523b does not correspond to the event aspect 509 and that tags 523a, 523c, and 523d do correspond to the event aspect 509 (e.g., tags, 523a, 523c, and 523d may contain keywords that match and/or substantially match keywords associated with the event aspect 509, such as "Trick Or Treat"). In an example, the query date range component 504 may determine that tags 523a, 523c, and 523d correspond to the event aspect 509 based upon confidence levels 528a, 528c, and 528d for content items 511a, 511c, and 511d exceeding a confidence level threshold. In another example, the query date range component 504 may determine that tag 523b does not correspond to the event aspect 509 based upon a confidence level 528b not exceeding the confidence level threshold. Responsive to tags 523a, 523c, and 523d corresponding to the event aspect 509 for the event 510, content items 511a, 511c, and 511d may be included in the set of content items 514.

The query date range component 504 may be configured to evaluate the set of content items 514 to identify temporal features 506 associated therewith. In an example, the set of content items 514 may comprise temporal features 513a, 513c, and 513d, which correspond to content items 511a, 511c, and 511d respectively. The query date range component 504 may be configured to extract the temporal features, such as file creation dates, modification dates, upload dates, etc., from tags 523a, 523c, and 523d (e.g., October 25$^{th}$, October 22$^{nd}$, October 27$^{th}$, etc.). In an example, the query date range 512 for the event 510 may be identified by the query date range component 504 based upon the temporal features temporal features 513a, 513c, and 513d (e.g., October 22$^{nd}$ through October 31$^{st}$. The query date range component 504 may be configured to determine a strict date range 518 and a periphery date range 516 for the event 510. The periphery date range 516 may be determined based upon the distribution of dates 515a-515c (e.g., October 25$^{th}$, October 22$^{nd}$, October 27$^{th}$) and a confidence score associated therewith. In an example, confidence scores for each date within the distribution of dates 515a-515c may be determined based upon a distance-in-time between the strict date range 518 and dates 515a-515c and/or the number of content items corresponding to a particular date within the distribution of dates 515a-515c.

FIG. 5C illustrates an example 531 of system 500 where the searching component 532 is configured to receive a search query 534, associated with the event 510, from a search user 536. In an example, responsive to receiving the search query 534, the searching component 532 may be configured to adjust the search query 534, based upon the query date range 512 provided by the query date range component 504, to create an adjusted search query 538. In an example, the searching component 532 may be configured to search the content corpus 508 utilizing the adjusted search query 538 to identify search query results 539 for the search query 536. The searching component 532 may rank the search query results 539 to generate ranked search query results 540. In an example, the search query results 539 may be ranked based upon confidence levels 528a, 528c, and 528d for the tags 523a, 523c, and 523d and/or the confidences scores for dates 515a-515c. In an example, determining the query date range 512 for the event 510 and adjusting the search query 534 based upon the query date range 512 may increase the efficiency with which search users interact with search tools and/or improve an overall user experience for search users with the search tools.

Figure 6:
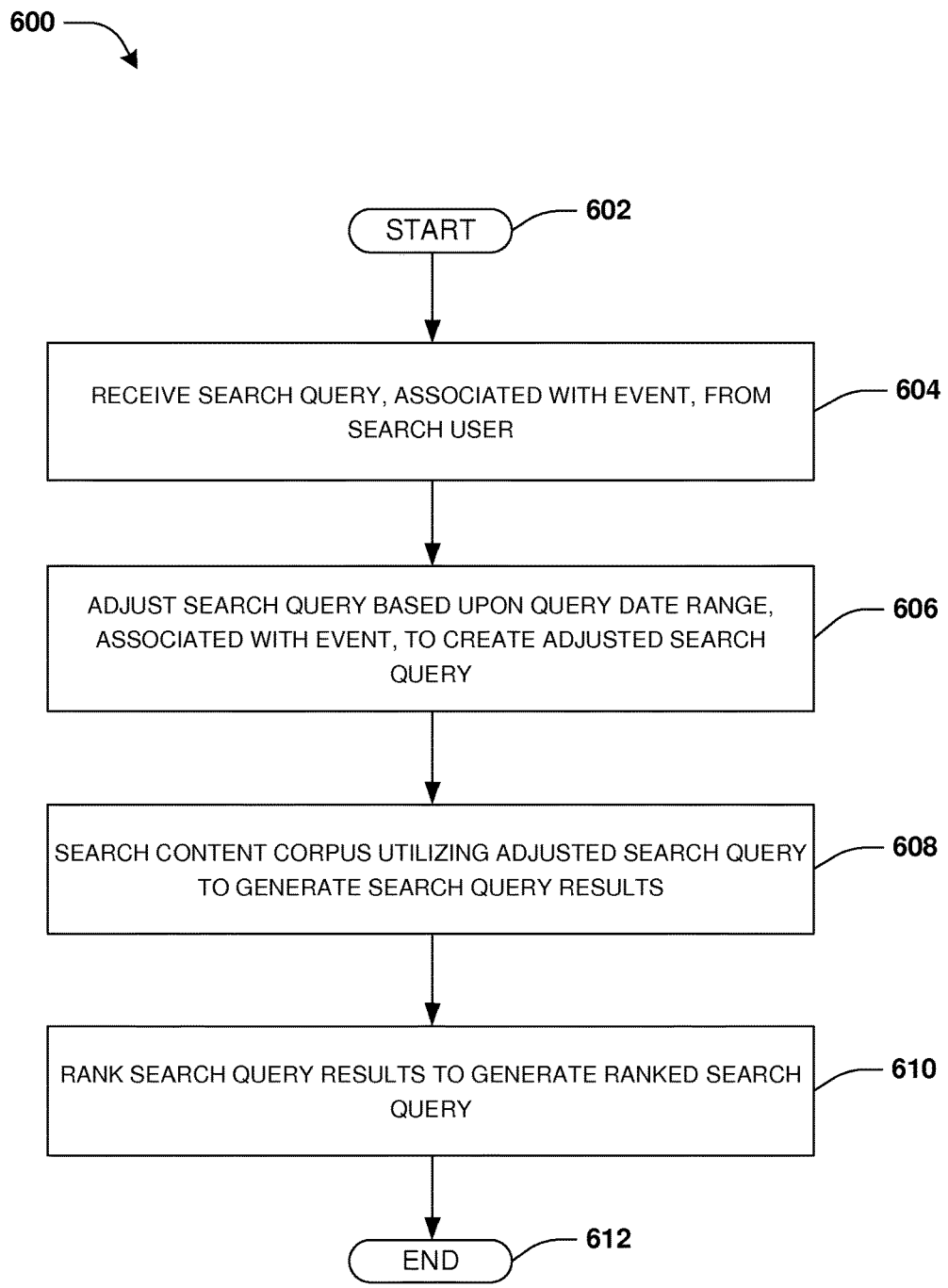
FIG. 6 is a flow chart illustrating an example method for performing a search of a content corpus utilizing a query date range for an event.

An embodiment of performing a search utilizing an adjusted search query is illustrated by an example method 600 of FIG. 6. At 602, the method 600 starts. At 604, a search query, associated with an event, may be received from a search user. In an example, a characteristic of the search user, such as a geographic location of a search user and/or an association of the search user with a community of users (e.g., a college attended by the search user, a membership of the search user with a group, organization, a corporation, a religion, a political party, a nationality of a search user, etc.) may be determined and subsequently evaluated to identify the event and/or a strict date range associated with the event (e.g., the strict date range for Christmas among members of Western Christian Churches is December $25^{th}$ whereas the strict date range for Christmas among members of the American Evangelical Church is January $6^{th}$; the strict date range for Autumn in North America is from the September equinox and to the winter solstice whereas the strict date range for Autumn in Australia is from March $1^{st}$ to May $31^{st}$). By way of example, responsive to a search user having a first geographic location (e.g., Canada), the event may be identified as being a first event (e.g., Thanksgiving in Canada) but not a second event (e.g., Thanksgiving in America) based upon the first event being associated with the first geographic location (e.g., the event location for Thanksgiving in Canada would be Canada). In another example, responsive to the search user being associated with a first community of users (e.g., a user profile of the search user may indicate that the search user graduated from a Canadian university), the event may be identified as being the first event (e.g., Thanksgiving in Canada) but not the second event (e.g., Thanksgiving in America) based upon the first event being associated with the first community of users. Responsive to identifying the event as the first event (e.g., Thanksgiving in Canada) but not the second event (e.g., Thanksgiving in America), a first strict date range may be determined for the first event (e.g., Thanksgiving in Canada being the $2^{nd}$ Monday in October each year).

At 606, the search query may be adjusted based upon a query date range, associated with event, to create an adjusted search query. In an example, the query date range may be utilized to adjust the search query by broadening or narrowing a date range associated with the search query. By way of example, the query date range may be determined based upon the strict date range for the event and/or a periphery date range for the event (e.g., temporal features may be extracted from content items, associated with the event, in a content corpus, and a distribution of dates may be built for Thanksgiving in Canada and not Thanksgiving in America). A plurality of query date ranges for a plurality of events may be contained within a lookup table. In an example, responsive to identifying the event as the first event but not the second event, a first query date range for the first event may be utilized to adjust the search query (e.g., responsive to determining that the event is Thanksgiving in Canada and not Thanksgiving in America, the query date for Thanksgiving in Canada may be determined from the lookup table and utilized to adjust the search query). In this way, a number of potentially irrelevant content items may be excluded from the search query results (e.g., content items associated with Thanksgiving in America may be excluded from the set of content items and/or from the search query results).

At 608, a content corpus may be searched utilizing the adjusted search query to generate search query results. At 610, the search query results may be ranked to generate ranked search query results. In an example, the search query results may comprise a first search query result, associated with a first date, having a first confidence score and a second search query result, associated with a second date, having a second confidence score, wherein the first confidence score and the second confidence score are determined based upon a density for the dates associated therewith. Responsive to the first confidence score being greater (e.g., having a higher density) than the second confidence score, the first search query result may be ranked above the second search query result within the search query results. In an example, the ranked search query results may be provided to the search user, wherein the first search query result is provide to the search user more prominently than the second search query result. In another example, responsive to identifying the event as the first event, the search query results corresponding to the first event may be ranked higher within the ranked search query results than search query results corresponding to the second event. In this way, a user experience and/or an operating efficiency of the search user performing the search and subsequently reviewing the ranked search query results may be improved (e.g., by providing content items that are more relevant to the search user more prominently than content items that are less relevant to the search user and/or by excluding potentially irrelevant content items from the search results in order to reduce the number of content items within the ranked search query results). At 612, the method ends.

Figure 7:
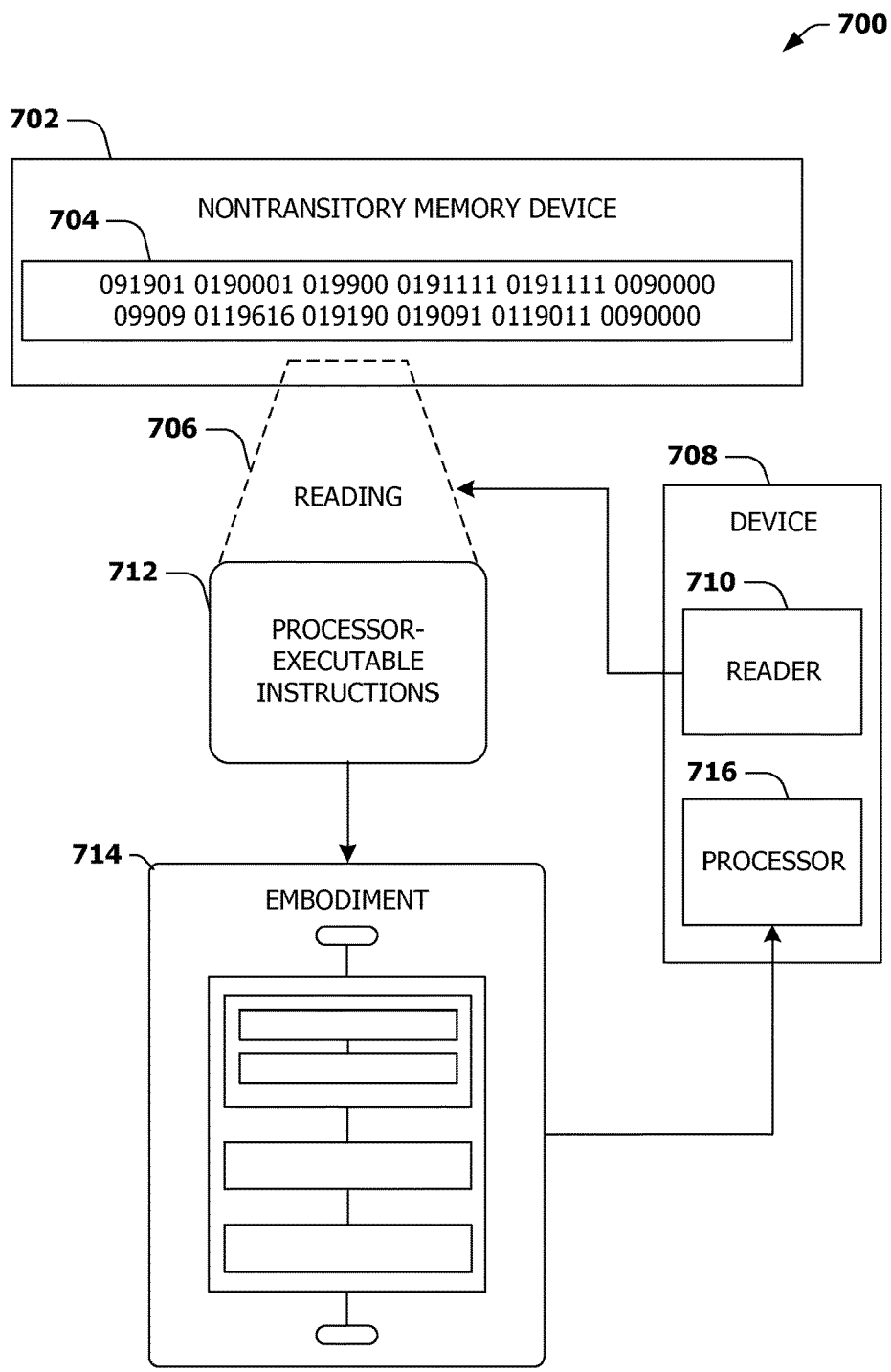
FIG. 7 is an illustration of a scenario featuring an example nontransitory memory device in accordance with one or more of the provisions set forth herein.

FIG. 7 is an illustration of a scenario 700 involving an example nontransitory memory device 702. The nontransitory memory device 702 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 702 stores computer-readable data 704 that, when subjected to reading 706 by a reader 710 of a device 708 (e.g., a read head of a hard disk drive, or a read operation invoked on a solid-state storage device), express processor-executable instructions 712. In some embodiments, the processor-executable instructions, when executed on a processor 716 of the device 708, are configured to perform a method, such as at least some of the example method 400 of FIG. 4 and/or at least some of the example method 600 of FIG. 6, for example. In some embodiments, the processor-executable instructions, when executed on the processor 716 of the device 708, are configured to implement a system, such as at least some of the example system 500 of FIGS. 5A-5C, for example.

3. Usage of Terms

As used in this application, "component," "module," "system," "interface," and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for determining a query date range for an event, comprising:

receiving, at a first time, a search query, associated with an event, from a first search user;

searching a content corpus using the search query to identify a first set of search query results, including a first search query result and a second search query result, for the search query;

identifying, at a second time after the first time, a set of content items, of the content corpus, associated with the event;

evaluating the set of content items to identify temporal features, comprising digital time stamps, for the set of content items;

responsive to identifying the temporal features by evaluation of the set of content items, determining a query date range of the set of content items based upon the temporal features;

responsive to determining the query date range of the set of content items, defining the query date range for the event with which the set of content items are associated, wherein the query date range is associated with the event in a lookup table, wherein the lookup table comprises a plurality of query date ranges each associated with at least one event;

receiving, at a third time after the second time, a second search query from a second search user;

evaluating the second search query to determine whether the second search query is associated with the event associated with the search query and the set of content items;

responsive to determining that the second search query is associated with the event associated with the search query and the set of content items:

selecting the query date range associated with the event, from amongst the plurality of query date ranges in the lookup table, based upon the event with which the second search query is associated; and automatically adjusting the second search query based upon the query date range defined for the event to create an adjusted search query; and searching the content corpus using the adjusted search query to identify a second set of search query results, including the first search query result but not the second search query result, for the adjusted search query.

2. The method of claim 1, wherein the second search query result is not included in the second set of search query results responsive to the second search result falling outside of the query date range.

3. The method of claim 1, the defining comprising:
tagging the set of content items with the query date range for facilitating search querying; and
the searching comprising:
identifying a content item, tagged with a tag specifying the query date range, as a search query result.

4. The method of claim 1, the event associated with at least one of an event location or an event community of users, and the identifying the set of content items comprising:
evaluating a content item within the content corpus to determine a geographical location associated with the content item or a community of users associated with the content item; and
responsive to the geographical location or the community of users corresponding to the event location or the event community of users, including the content item within the set of content items.

5. The method of claim 1, the receiving the second search query comprising:
determining a characteristic of the second search user, the characteristic corresponding to at least two of a geographic location of the second search user, a user demographic, social network profile information, or an association of the second search user with a community of users; and
utilizing a first query date range, but not a second query date range, based upon the characteristic.

6. The method of claim 1, the event comprising a holiday, an anniversary, a season, a community event, an environmental event, a month, a decade, or a reoccurring event.

7. The method of claim 1, the identifying the set of content items comprising:
evaluating a content item within the content corpus to identify a tag of the content item; and
responsive to the tag corresponding to the event, including the content item in the set of content items.

8. The method of claim 1, the determining the query date range comprising:
determining a strict date range for the event;
determining a periphery date range for the event based upon densities for dates within a distribution of dates corresponding to the temporal features; and
determining the query date range based upon the strict date range and the periphery date range.

9. The method of claim 8, the determining the periphery date range comprising:
evaluating the distribution of dates to determine a confidence score for the dates within the distribution of dates based upon at least one of the densities for the dates within the distribution of dates or a distance in time between the strict date range and the dates within the distribution of dates; and
responsive to the confidence score for a date within the distribution of dates exceeding a confidence score threshold, including the date in the periphery date range.

10. The method of claim 1, the second set of search query results comprising the first search query result, associated with a first date, having a first confidence score based upon a first density for the first date and a third search query result, associated with a second date, having a second confidence score based upon a second density for the second date, and the method comprising:
responsive to the first confidence score being greater than the second confidence score, ranking the first search query result above the third search query result within the second set of search query results to generate ranked search query results; and
providing the ranked search query results to the second search user, wherein the first search query result is provided to the second search user more prominently than the third search query result.

11. The method of claim 1, comprising:
ranking a search query result based upon a confidence score for a date associated with the search query result, wherein the confidence score corresponds to a density for the date and a confidence level for a tag of the search query result to generate a ranked search query result.

12. The method of claim 1, wherein the query date range comprises one or more dates or date ranges within one or more time periods.

13. The method of claim 5, the community of users comprising:
a social media community, a microblogging community, a workgroup community, an online forum community, or an image sharing community.

14. The method of claim 1, the content corpus comprising digital image content items, and the identifying the set of content items comprising:
evaluating a content item within the content corpus to identify a feature of the content item;
evaluating the feature to determine an object depicted within the content item; and
responsive to the object corresponding to the event, including the content item within the set of content items.

15. A system for determining a query date range comprising:
a processor; and
memory comprising processor-executable instructions that when executed by the processor cause implementation of:
a query date range component configured to:
identify a set of content items, of a content corpus, associated with an event, comprising:
evaluating a tag of a content item within the set of content items; and
responsive to the tag corresponding to the event, including the content item within the set of content items;
identify temporal features for the set of content items;
responsive to identifying the temporal features for the set of content items, determine a query date range for the event based upon the temporal features, comprising:
generating a distribution of dates for one or more time periods based upon the temporal features;
determining densities for dates within the distribution of dates based upon a number of content items within the set of content items associated with the dates; and
determining the query date range based upon the densities for the dates within the distribution of dates; and responsive to determining the query date range for the event, define the query data range for the event with which the set of content items are associated, wherein the query date range is associated with the event in a lookup table, wherein the lookup table comprises a plurality of query date ranges each associated with at least one event; and a searching component configured to:
  receive a search query from a search user;
  evaluate the search query to determine whether the search query is associated with the event associated with the set of content items;
  responsive to determining that the search query is associated with the event associated with the set of content items:
    select the query date range associated with the event, from amongst the plurality of query date ranges in the lookup table, based upon the event with which the search query is associated; and
    automatically adjust the search query based upon the query date range defined for the event to create an adjusted search query; and
    search the content corpus using the adjusted search query to identify search query results for the adjusted search query.

16. The system of claim 15, the query date range component configured to:
evaluate the distribution of dates to determine a confidence score for the dates within the distribution of dates based upon at least one of the densities of the dates within the distribution of dates or a distance in time between a strict date range and the dates within the distribution of dates; and
responsive to the confidence score for a date within the distribution of dates exceeding a confidence score threshold, include the date in a periphery date range.

17. The system of claim 15, the searching component configured to not include a first search result in the search query results responsive to the first search result falling outside of the query date range.

18. The system of claim 15, the search query results comprising a first search query result associated with a first date having a first density and a second search query result associated with a second date having a second density, and the searching component configured to:
rank the first search query result above the second search query result within the search query results in response to the first density for the first date being greater than the second density for the second date to generate ranked search query results; and
provide the ranked search query results to the search user, wherein the first search query result is provided to the search user more prominently than the second search query result.

19. A non-transitory computer readable medium comprising computer executable instructions that when executed by a processor perform a method for searching a content corpus utilizing an adjusted search query, the method comprising:
receiving a search query from a search user;
determining a query date range for an event based upon densities for dates within a distribution of dates for a set of content items associated with the event;
responsive to determining the query date range for the event, defining the query date range for the event with which the set of content items are associated, wherein the query date range is associated with the event in a lookup table, wherein the lookup table comprises a plurality of query date ranges each associated with at least one event;
evaluating the search query to determine whether the search query is associated with the event associated with the set of content items;
responsive to determining that the search query is associated with the event associated with the set of content items:
  selecting the query date range, from amongst the plurality of query date ranges in the lookup table, based upon the event with which the search query is associated; and
  automatically adjusting the search query based upon the query date range to create an adjusted search query;
searching the content corpus using the adjusted search query to identify search query results for the search query; and
ranking a search query result based upon a confidence score for a date associated with the search query result, wherein the confidence score corresponds to a density for the date to generate a ranked search query result.

20. The non-transitory computer readable medium of claim 19, the defining comprising:
tagging the set of content items with the query date range for facilitating search querying.

* * * * *